United States Patent
Takezoe et al.

(10) Patent No.: US 10,532,406 B2
(45) Date of Patent: *Jan. 14, 2020

(54) SINTERED SLIDING MEMBER HAVING EXCEPTIONAL CORROSION RESISTANCE, HEAT RESISTANCE, AND WEAR RESISTANCE; AND METHOD FOR PRODUCING SAID MEMBER

(71) Applicant: Diamet Corporation, Niigata-shi (JP)

(72) Inventors: Shinichi Takezoe, Niigata (JP); Yoshinari Ishii, Niigata (JP)

(73) Assignee: Diamet Corporation, Niigata-shi (JP)

( * ) Notice: Subject to any disclaimer, the term of this patent is extended or adjusted under 35 U.S.C. 154(b) by 76 days.

This patent is subject to a terminal disclaimer.

(21) Appl. No.: 15/510,561

(22) PCT Filed: Sep. 10, 2015

(86) PCT No.: PCT/JP2015/075751
§ 371 (c)(1),
(2) Date: Mar. 10, 2017

(87) PCT Pub. No.: WO2016/039423
PCT Pub. Date: Mar. 17, 2016

(65) Prior Publication Data
US 2017/0282250 A1    Oct. 5, 2017

(30) Foreign Application Priority Data
Sep. 11, 2014  (JP) .................................. 2014-185453

(51) Int. Cl.
*B22F 7/00* (2006.01)
*B22F 5/10* (2006.01)
(Continued)

(52) U.S. Cl.
CPC ............ *B22F 5/106* (2013.01); *B22F 1/0003* (2013.01); *B22F 3/11* (2013.01); *B22F 3/16* (2013.01);
(Continued)

(58) Field of Classification Search
None
See application file for complete search history.

(56) References Cited

U.S. PATENT DOCUMENTS 5,938,864 A * 8/1999 Tomikawa ............... C22C 9/06
                                                           148/434
8,999,232 B2 4/2015 Ishii et al.
(Continued)

FOREIGN PATENT DOCUMENTS

JP     62-133027 A    6/1987
JP     01-198407 A    8/1989
(Continued)

OTHER PUBLICATIONS

International Search Report dated Dec. 15, 2015 for the corresponding PCT Application No. PCT/JP2015/075751.
(Continued)

*Primary Examiner* — Seth Dumbris
(74) *Attorney, Agent, or Firm* — Leason Ellis LLP

(57) ABSTRACT

A sintered sliding material with excellent corrosion resistance, heat resistance, and wear resistance is provided. The sintered sliding material has a composition made of: 36-86 mass % of Ni; 1-11 mass % of Sn; 0.05-1.0 mass % of P; 1-9 mass % of C; and the Cu balance including inevitable impurities. The sintered sliding material is made of a sintered material of a plurality of grains of alloy of Ni—Cu alloy or Cu—Ni alloy, the Ni—Cu alloy and the Cu—Ni alloy containing Sn, P, C, and Si; has a structure in which pores are dispersedly formed in grain boundaries of the
(Continued)

plurality of the grains of alloy; and as inevitable impurities in a matrix constituted from the grains of alloy, a C content is 0.6 mass % or less and a Si content is 0.15 mass % or less.

15 Claims, 3 Drawing Sheets

(51) Int. Cl.
<table><tr><td>B22F 3/11</td><td>(2006.01)</td></tr><tr><td>C22C 9/06</td><td>(2006.01)</td></tr><tr><td>C22C 19/03</td><td>(2006.01)</td></tr><tr><td>B22F 1/00</td><td>(2006.01)</td></tr><tr><td>B22F 3/16</td><td>(2006.01)</td></tr><tr><td>C22C 19/00</td><td>(2006.01)</td></tr><tr><td>C22C 30/02</td><td>(2006.01)</td></tr><tr><td>C22C 30/04</td><td>(2006.01)</td></tr><tr><td>F16C 33/12</td><td>(2006.01)</td></tr><tr><td>F16C 33/14</td><td>(2006.01)</td></tr><tr><td>C22C 1/04</td><td>(2006.01)</td></tr><tr><td>C22C 1/08</td><td>(2006.01)</td></tr><tr><td>C22C 1/10</td><td>(2006.01)</td></tr></table>

(52) U.S. Cl.
CPC .......... *C22C 1/0425* (2013.01); *C22C 1/0433* (2013.01); *C22C 1/08* (2013.01); *C22C 1/1084* (2013.01); *C22C 9/06* (2013.01); *C22C 19/002* (2013.01); *C22C 19/03* (2013.01); *C22C 30/02* (2013.01); *C22C 30/04* (2013.01); *F16C 33/128* (2013.01); *F16C 33/145* (2013.01); *B22F 2301/10* (2013.01); *B22F 2301/15* (2013.01); *B22F 2301/30* (2013.01); *B22F 2302/40* (2013.01); *B22F 2998/10* (2013.01); *F16C 2204/10* (2013.01); *F16C 2204/52* (2013.01)

(56) References Cited

U.S. PATENT DOCUMENTS

<table><tr><td>2003/0143096 A1</td><td>7/2003</td><td>Shimizu et al.</td></tr><tr><td>2004/0120614 A1*</td><td>6/2004</td><td>Noboru ................. C22C 1/0425<br>384/1</td></tr><tr><td>2007/0258668 A1</td><td>11/2007</td><td>Shimizu et al.</td></tr><tr><td>2009/0011268 A1</td><td>1/2009</td><td>Shimizu et al.</td></tr><tr><td>2009/0311129 A1</td><td>12/2009</td><td>Hirakawa et al.</td></tr><tr><td>2012/0145284 A1</td><td>6/2012</td><td>Ishii et al.</td></tr><tr><td>2012/0204677 A1*</td><td>8/2012</td><td>Ishii ....................... C22C 1/0433<br>75/244</td></tr><tr><td>2013/0189150 A1</td><td>7/2013</td><td>Ishii et al.</td></tr><tr><td>2013/0223774 A1</td><td>8/2013</td><td>Ishii et al.</td></tr></table>

FOREIGN PATENT DOCUMENTS

<table><tr><td>JP</td><td>2004-315940 A</td><td></td><td>11/2004</td><td></td></tr><tr><td>JP</td><td>2005-082867 A</td><td></td><td>3/2005</td><td></td></tr><tr><td>JP</td><td>2006-063398 A</td><td></td><td>3/2006</td><td></td></tr><tr><td>JP</td><td>2006-090482 A</td><td></td><td>4/2006</td><td></td></tr><tr><td>JP</td><td>2006-199977 A</td><td></td><td>8/2006</td><td></td></tr><tr><td>JP</td><td>4521871 B</td><td></td><td>8/2010</td><td></td></tr><tr><td>JP</td><td>2013-023707 A</td><td></td><td>2/2013</td><td></td></tr><tr><td>JP</td><td>2013-144849 A</td><td></td><td>7/2013</td><td></td></tr><tr><td>JP</td><td>2013144849</td><td>*</td><td>7/2013</td><td>............... C22C 9/06</td></tr><tr><td>JP</td><td>5337884 B</td><td></td><td>11/2013</td><td></td></tr><tr><td>JP</td><td>5386585 B</td><td></td><td>1/2014</td><td></td></tr><tr><td>WO</td><td>WO-2006/022337 A</td><td></td><td>3/2006</td><td></td></tr><tr><td>WO</td><td>WO-2006/077826 A</td><td></td><td>7/2006</td><td></td></tr><tr><td>WO</td><td>WO-2008-001789 A1</td><td></td><td>1/2008</td><td></td></tr><tr><td>WO</td><td>WO 2010/147139 A</td><td></td><td>12/2010</td><td></td></tr><tr><td>WO</td><td>WO-2011/024941 A</td><td></td><td>3/2011</td><td></td></tr><tr><td>WO</td><td>WO-2012/063785 A</td><td></td><td>5/2012</td><td></td></tr><tr><td>WO</td><td>WO-2012/063786 A</td><td></td><td>5/2012</td><td></td></tr></table>

OTHER PUBLICATIONS

Extended European Search Report dated May 22, 2018 for the corresponding European Patent Application No. 15839255.5. (Previously submitted in the IDS filed Jul. 5, 2018).
Extended European Search Report dated May 22, 2018 for the corresponding European Patent Application No. 1589255.5.
Office Action dated Dec. 4, 2017 for the corresponding Chinese Patent Application No. 201580047730.X.
Non-Final Office Action in related U.S. Appl. No. 15/507,567, dated Apr. 2, 2019.
International Search Report dated Nov. 17, 2015 for the related PCT Application No. PCT/JP2015/075180.
Extended European Search Report dated Feb. 20, 2018 for the related European Patent Application No. 15838869.4.
Office Action dated Jan. 3, 2018 for the related Chinese Patent Application No. 201580046121.2.

* cited by examiner

| | SURFACE STATE AFTER CORROSION TEST | SURFACE STATE BEFORE CORROSION TEST |
|---|---|---|
| EXAMPLE OF THE PRESENT INVENTION (EXAMPLE 3) |  |  |
| COMPARATIVE EXAMPLE (COMPARATIVE EXAMPLE 32) |  |  |

SINTERED SLIDING MEMBER HAVING EXCEPTIONAL CORROSION RESISTANCE, HEAT RESISTANCE, AND WEAR RESISTANCE; AND METHOD FOR PRODUCING SAID MEMBER

CROSS-REFERENCE TO RELATED PATENT APPLICATIONS

This application is a U.S. National Phase Application under 35 U.S.C. § 371 of International Patent Application No. PCT/JP2015/075751, filed Sep. 10, 2015, and claims the benefit of Japanese Patent Application No. 2014-185453, filed on Sep. 11, 2014, all of which are incorporated herein by reference in their entirety. The International Application was published in Japanese on Mar. 17, 2016 as International Publication No. WO/2016/039423 under PCT Article 21(2).

FIELD OF THE INVENTION

The present invention relates to a sintered sliding material with corrosion resistance, heat resistance, and wear resistance and a method for producing the same used: under a corrosive environment, which is in a liquid of sea water or the like or includes the snow melting agent; in a corrosive atmosphere, which is at a high temperature and contains exhaust gas; and in a fuel, which contains sulfur, organic acid, or the like.

BACKGROUND OF THE INVENTION

An example of the sliding part, which is used in the corrosive environment in liquid, is a sliding material forming a bearing that supports the rotating shaft in the casing of the motor fuel pump provided to the engine utilizing liquid fuel such as gasoline and light oil. In addition, as examples of the sliding material used in the corrosive atmosphere such as sea water and the snow melting agent, the sliding material for the outboard motor; and the exhaust throttle valve used for the diesel exhaust gas purification system, are known.

In addition, as examples of the sliding material used in the corrosive atmosphere of high temperature, exhaust gas, or the like, the exhaust throttle valve used for the diesel exhaust gas purification system; and the recirculation exhaust gas flow control valve of the EGR (Exhaust Gas Recirculation) type internal combustion engine, are known.

The engine that uses the liquid fuel such as gasoline and light oil with the motor fuel pump is used all over the world; and high wear resistance is demanded for the motor fuel pump. Qualities of liquid fuel vary worldwide depending on locations. Thus, depending on the locations, there is an area, in which bad quality gasoline with poor quality is used. Thus, corrosion resistance against the bad quality gasoline is needed for the sliding material of the bearing used for the motor fuel pump.

Conventionally, as an example of the bearing sliding material of this type of usage, the sliding material made of the sintered Cu—Ni-based alloy, which has the composition of Cu-21 to 35% Ni-5 to 12% Sn-3 to 7% C-0.1 to 0.8% P, is known (refer Japanese Patent No. 4521871 (B)).

In addition, as a sliding material used: in the high temperature corrosive atmosphere; and under the corrosive environment due to salt such as sea water and the snow melting agent, the sliding materials made of stainless or sintered alloy, which is subjected to a surface treatment such as nitriding, is known (refer Japanese Patent No. 5386585 (B)).

In addition, as a sintered sliding part having excellent corrosion resistance and wear resistance under the high temperature environment, the sintered sliding part, in which the amounts of Cu and Si are defined and boron nitride is added in a predetermined ratio, is known (refer Japanese Patent No. 5337884 (B)).

Technical Problem

The bearing of the motor fuel pump described in Japanese Patent No. 4521871 (B) is made of the sintered Cu—Ni-based alloy having the composition of: 21-35 mass % of Ni; 5-12 mass % of Sn; 3-7 mass % of C; 0.1-0.8 mass % of P; and the Cu balance including inevitable impurities. In this sintered alloy, pores are dispersed in the matrix in the porosity of 8-18%; P is contained most in the grain boundary part; and the sintered alloy has the structure in which free graphite is distributed in the above-mentioned pores. The sintered alloy has the structure, in which the alloy layer with high Sn concentration containing Sn at 50 mass % or more, on the inner surface of the open pores formed to be opened on the surface of the bearing made of this sintered Cu—Ni-based alloy, on at least periphery of the opening of the pores, and on the inner surface of the internal pores internally existing in the inside of the bearing.

The sintered sliding material described in Japanese Patent No. 5386585 (B) contains: 63-90 mass % of Ni; at least one of 2-20 mass % of Sn and 0.1-1.2 mass % of P; and the Cu balance including inevitable impurities.

The sintered sliding material described in Japanese Patent No. 5337884 (B) has the composition containing: 7.7-30.3 mass % of Cu; 2.0-20.0 mass % of Sn; 0.3-7.0 mass % of boron nitride; and the Ni balance including inevitable impurities.

The sintered sliding material used for the motor fuel pump is immersed in liquid fuel at all times. As liquid fuel, not only the conventional liquid fuel such as the gasoline and light oil but also alcohol-containing gasoline utilizing energy from biomass is put to practical use depending on the area speaking on a global scale, because of resource depletion and attempt to reduce $CO_2$ emission. Recently, gasoline with high alcohol addition rate tends to be used.

However, the alcohol-containing gasoline lacks oxidative stability under high-temperature high-humidity environment or the like; and it is possible that the alcohol-containing gasoline is converted to include a large amount of corrosive liquid such as carboxylic acid. Therefore, excellent corrosion resistance beyond conventional is required for the sintered sliding material used for the motor fuel pump.

In this context, the corrosion resistance of the Cu—Ni—Sn—P—C-based sintered sliding material disclosed in Japanese Patent No. 4521871 (B) against even more highly-concentrated acid is not sufficient. In the common corrosion resistant material, it is known that having a uniform structure is beneficial for improving corrosion resistance. In addition, increasing the sintering temperature is effective for forming the uniform structure in the sintered material.

However, in the sintered sliding material disclosed in Japanese Patent No. 4521871 (B), dimensional change is increased if the sintering temperature of 890-970° C. is increased further; and there is a technical problem that production yield is deteriorated. For example, in the sintered sliding material described in Japanese Patent No. 4521871 (B), the alloy layer with high Sn concentration is formed in the grain boundaries of the Cu—Ni alloy grains. Thus, the dimensional change is increased if the sintering temperature is increased for obtaining the uniform structure. In this case, there are problems of: not being able to shape the sintered material by placing it in a mold; and not being able to obtain the intended dimensional accuracy, during sizing for setting the dimension as the final product.

Under the circumstance described above, the inventors of the present invention conducted extensive studies about this type of sintered material. They focused on the influence of extremely trace amount of impurities, such as C, Si, and the like, which is included in the matrix of the sintered sliding material, on a Cu—Ni—Sn—P—C-based sintered sliding material with a metal structure, in which the alloy layer with high Sn concentration having been precipitated in grain boundaries in the past is reduced by increasing the sintering temperature. Then, they found that these impurity elements greatly affect the sintering dimensional change even if they are in extremely trace amounts, and made the present invention.

The present invention is made under circumstances described above. The purpose of the present invention is to provide a sintered sliding material having excellent corrosion resistance, heat resistance, and wear resistance by controlling the amounts of C and Si as impurities included in the matrix of the sintered material.

SUMMARY OF THE INVENTION

Solution to Problem

An aspect of the present invention is a sintered sliding material with excellent corrosion resistance, heat resistance, and wear resistance (hereinafter, referred as "the sintered sliding material of the present invention") having a composition made of: 36-86 mass % of Ni; 1-11 mass % of Sn; 0.05-1.0 mass % of P; 1-9 mass % of C; and the Cu balance including inevitable impurities, wherein the sintered sliding material is made of a sintered material of a plurality of grains of alloy of Ni—Cu alloy or Cu—Ni alloy, the Ni—Cu alloy and the Cu—Ni alloy containing Sn, P, C, and Si, the sintered material has a structure in which pores are dispersedly formed in grain boundaries of the plurality of the grains of alloy, and as inevitable impurities in a matrix (base material) constituting the grains of alloy, a C content is 0.6 mass % or less and a Si content is 0.15 mass % or less.

In the sintered sliding material of the present invention, a porosity of the sintered material may be 8-28%.

In the sintered sliding material of the present invention, free graphite may interpose in the grain boundaries of the sintered material.

Other aspect of the present invention is a method of producing a sintered sliding material with excellent corrosion resistance, heat resistance, and wear resistance (hereinafter referred as "the method of producing a sintered sliding material of the present invention"), the method including the steps of: obtaining a mixed powder by mixing a plurality of powders containing one or more among Cu, Ni, Sn, P, and C in such a way that a total composition of the mixed powder becomes: 36-86 mass % of Ni; 1-11 mass % of Sn; 0.05-1.0 mass % of P; 1-9 mass % of C; and the Cu balance by using at least one of: a Cu—Ni alloy powder in which a C content is 0.6 mass % or less and a Si content is 0.15 mass % or less as inevitable impurities; and a Ni—Cu alloy powder in which a C content is 0.6 mass % or less and a Si content is 0.15 mass % or less as inevitable impurities; producing a green compact by pressing the mixed powder; and obtaining a sintered sliding material having a structure containing: an integrated matrix; and free graphite dispersed in a plurality of pores by sintering the green compact at 960-1140° C. for a plurality of grains of alloy made of a Cu—Ni alloy or a Ni—Cu alloy to disperse the plurality of pores in grain boundaries of the plurality of grains of alloy.

In the method of producing a sintered sliding material of the present invention, the mixed powder may be obtained by mixing: at least one of a Cu—Ni alloy powder and a Ni—Cu alloy powder; a Sn powder; a Cu—P alloy powder; and C powder.

In the method of producing a sintered sliding material of the present invention, as inevitable impurities in the matrix, a C content may be 0.6 mass % or less, a Si content may be 0.15 mass % or less.

In the method of producing a sintered sliding material of the present invention, a porosity of the sintered material may be 8-28%.

Advantageous Effects of Invention

According to the present invention, a sintered sliding material, which has excellent wear resistance and lubricity; and excellent corrosion resistance under high-temperature environment as a sliding material used under high-temperature corrosive environment, can be provided, since grains of Ni—Cu alloy or Cu—Ni alloy are sintered; and it is obtained as the sintered sliding material in which free graphite disperses the pores in grain boundaries.

In addition, by setting the C content and the Si content as impurities included in grains of the Ni—Cu alloy or the Cu—Ni alloy to the defined amounts or less, a sintered sliding material, which does not easily cause large dimensional change and can be produced with good yield, can be provided.

In addition, a sintered sliding material, which: is suitable for the bearing part or the like used immersed in gasoline at all times such as the motor fuel pump; has excellent corrosion resistance under high-temperature environment even in the case where it is immersed in mixed gasoline including light oil, alcohol, etc., and corrosive liquid such as organic acid depending on the area, can be provided.

DETAILED DESCRIPTION OF OF THE INVENTION

Figure 1:
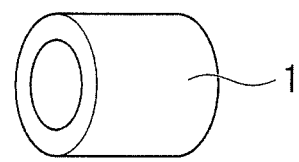
FIG. 1 is a perspective view showing an example of a ring-shaped bearing part formed of the sintered sliding material according to the present invention.

An embodiment of the present invention is explained in reference to drawings below.

In the drawings used for the explanations below, a characteristic part is shown as an enlarged manner occasionally for emphasizing the characteristic part for convenience; and the dimension ratio of each constituent or the like is not necessarily the same as the actual case. In addition, a part not corresponding to the characteristic part is omitted in the drawings occasionally for the same purpose.

FIG. 1 shows the ring-shaped bearing part 1 made of the sintered sliding material according to the present invention. The bearing part 1 is constituted from the sintered sliding material having the sectional structure shown in FIG. 2, for example. The bearing part 1 is used as the bearing part of the motor fuel pump 2 shown in FIG. 3, for example.

Figure 3:
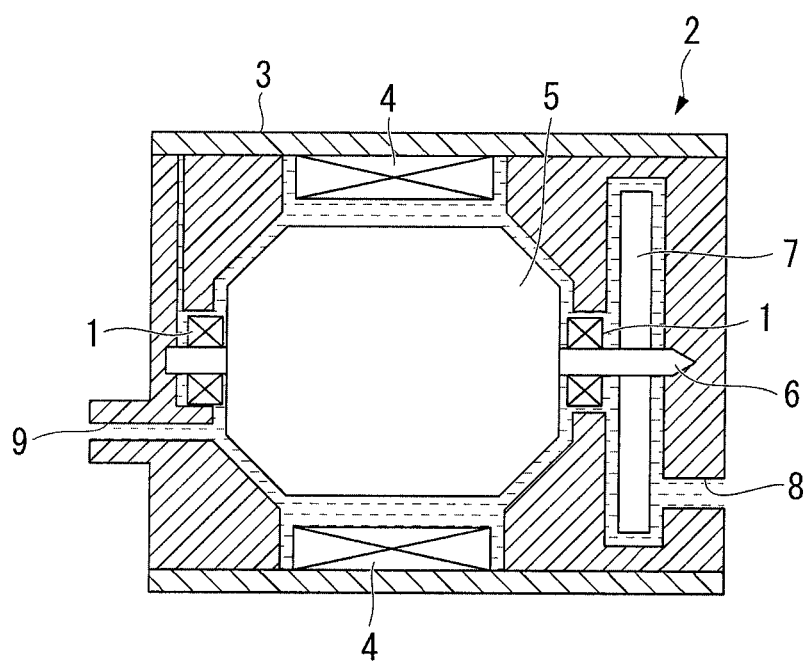
FIG. 3 is an exploded side view showing an example of a fuel pump including the bearing part.

In the motor fuel pump 2 shown in FIG. 3, the motor (armature) 5 is provided surrounded by the magnet 4 in the cylindrical casing 3. Both ends of the rotating shaft 6 of the motor 5 are rotatably supported by the bearing parts 1, each of which is provided in the casing 3. In the structure shown in FIG. 3, the impeller 7 is attached to one end side of the rotating shaft 6; and the narrow gasoline passage is formed along: the outer periphery of the impeller 7; the outer periphery of the motor 5; and the gap between the bearing parts 1, 1 and the rotating shaft 6.

In the motor fuel pump 2, the impeller 7 is rotated by the rotation of motor 5; gasoline is imported in the casing 3 from the inlet 8 provided to the one end side of the casing 3 by the torque of the impeller 7; and the gasoline flows along the above-described gasoline passage. Then, the gasoline is discharged from the outlet 9 provided to the other end side of the casing 3.

The motor fuel pump 2 is provided to the inside of the fuel tank of internal-combustion engine in such a way that it is immersed in gasoline, for example. The outlet 9 of the fuel pump 2 is connected to the fuel ejector through the filter device and the injector, which are omitted from depiction in the drawing.

The motor fuel pump 2 shown in FIG. 3 is used in the state where it is immersed in gasoline at all times; and the bearing parts 1 supporting the rotating shaft 6 are used in the state where they are immersed in the gasoline at all times too. Thus, excellent corrosion resistance against gasoline is needed for the bearing parts 1.

Figure 2:
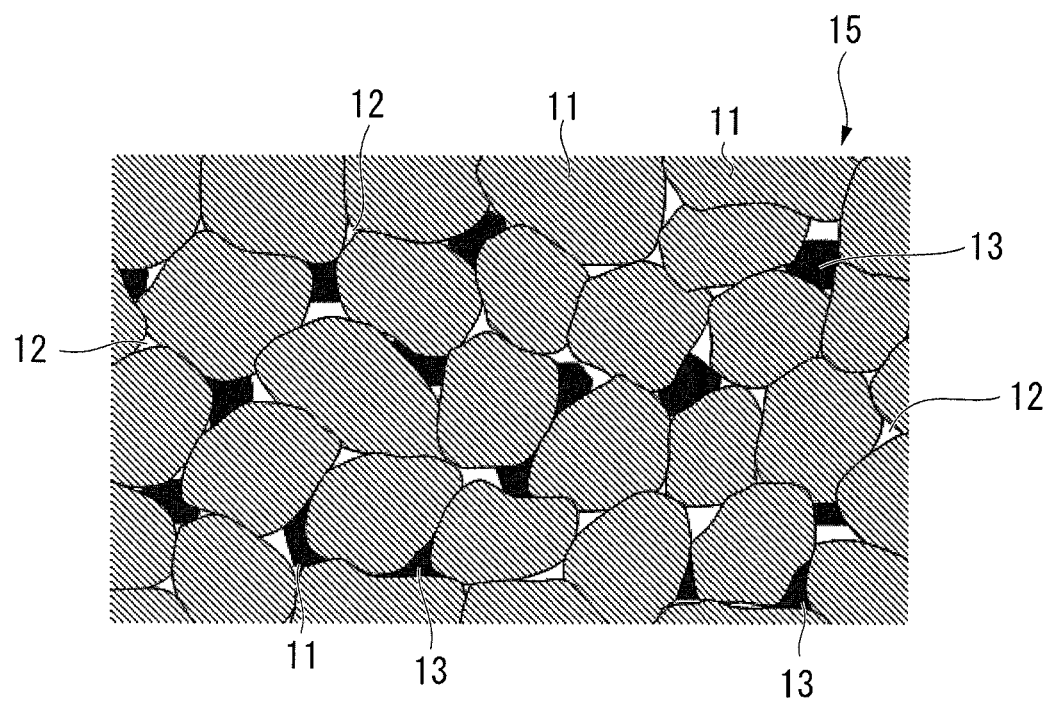
FIG. 2 is an enlarged structural diagram of a sintered sliding material constituting the bearing part.

Thus, the bearing part 1 of the present embodiment is made of the sintered sliding material 15 having the structure in which the pores 12 are dispersedly distributed in the grain boundary parts of multiple alloy grains 11 in the cross section as shown in the structural diagram in FIG. 2; and the free graphite 13 are dispersed in insides of the pores 12. The alloy grains 11 are made of the Cu—Ni alloy grains or the Ni—Cu alloy grains including Sn, P, and C; and the matrix of the sintered sliding material 15 is constituted from the multiple alloy grains 11, the dispersedly distributed pores 12, and the free graphite.

The method of producing the sintered sliding material 15 will be described in detail later. The sintered sliding material 15 can be obtained by: uniformly mixing predetermined amounts of one or both of the Cu—Ni alloy powder and the Ni—Cu alloy powder, the Sn powder, the Cu—P powder, and the graphite powder; press molding the mixed powder; and sintering the obtained green compact at 960-1140° C., for example.

Excellent sliding characteristics and corrosion resistance are ensured by the alloy grains 11 made of the Cu—Ni alloy grains or the Ni—Cu alloy grains, which constitutes the matrix. In addition, high lubricity can be obtained by lubrication action of the free graphite, which is distributed in the pores 12 dispersedly distributed in the matrix of the bearing part 1 and has high lubricity. Moreover, wear resistance is improved further by action of fluid lubrication film formed by the liquid fuel provided from the outer periphery of the bearing part 1 to the inner periphery of the bearing part 1 through the pores 12 existing in the inside of the bearing part 1. In addition, alloying of the main phase can be strengthened by reducing the precipitation of the grain boundary phase for the bearing part 1 to show high strength. As a result, it is possible for the bearing part 1 to be thin-layered or reduced in the diameter.

It is preferable that the composition ratio of the sintered sliding material 15 includes: 36-85 mass % of Ni; 1-11 mass % of Sn; 0.05-1.0 mass % of P; and 1-9 mass % of C. In addition, it is preferable that as inevitable impurities included in the matrix constituted from the alloy grains 11, the C content is 0.6 mass % or less and the Si content is 0.15 mass % or less.

Reasons for defining each of the composition ratio are explained below.

[Ni: 36-86%]

Addition of Ni is effective on giving excellent strength, wear resistance and corrosion resistance. If the Ni content were less than 36%, corrosion resistance as the sintered sliding material would not be sufficient. If the Ni content were 86% or more, sliding characteristics of the sintered sliding material would be reduced.

By selecting a proper sintering condition for the structure of the sintered sliding material, the Ni content of which is 36-86%, to be a uniform structure excluding solid lubricant, corrosion resistance is improved. A testing piece, the Ni content of which is 89%, hardness and strength of the testing piece itself are too high; and the shaft is damaged. Thus, it is not preferable.

Although it is not necessarily indispensable configuration, a more preferable Ni content is 40 mass % to 80 mass %. An even more preferable Ni content is 45 mass % to 70 mass %.

[Sn: 1-11%]

Addition of Sn is effective on improving corrosion resistance, strength, and wear resistance. If the Sn content were less than 1%, corrosion resistance as the sintered sliding material is reduced; and sufficient strength cannot be obtained. If the Sn content were 12% or more, it would be possible that Sn precipitates on the surface of the sintered material. In addition, the dimension of the sintered sliding material varies; and dimensional consistency is destabilized during sintering. Thus, it is not preferable for Sn to be included at 12% or more in sintered sliding material of the present embodiment.

Although it is not necessarily indispensable configuration, a more preferable Sn content is 3 mass % to 11 mass %. An even more preferable Sn content is 4 mass % to 10 mass %.

[P: 0.05-1.0%]

Addition of P is effective on improving sinterability and strength of the matrix in the sintered sliding material of the present embodiment. However, if the P content were less 0.05%, the effect of improving sinterability would not be obtained sufficiently; and sufficient strength would not be obtained. On the other hand, if P were added at 1.25% or more in the sintered sliding material of the present embodiment, the liquid phase of Cu—P would be enlarged during sintering. In this case, levels of deformation and dimensional change become too high, and not preferable.

Although it is not necessarily indispensable configuration, a more preferable P content is 0.1 mass % to 0.8 mass %. An even more preferable P content is 0.1 mass % to 0.6 mass %.

[C: 1-9%]

Mainly, C exists in the pores dispersedly distributed in the matrix of the sintered sliding material as free graphite. Addition of C is effective on giving excellent lubricity to the sintered sliding material and improving wear resistance. If the C content were less than 1%, the lubricity effect would not be obtained; and the sintered sliding material would not be able to exhibit the function as the sintered sliding material. If the C content were 9% or more, the dimension and weight of the sintered sliding material during molding would vary; and the dimensional consistency of the sintered sliding material during sintering would be destabilized. Thus, it is not preferable.

Although it is not necessarily indispensable configuration, a more preferable C content is 2 mass % to 8 mass %. An even more preferable C content is 3 mass % to 8 mass %.
[C Content and Si Content in the Cu—Ni Alloy Powder or the Ni—Cu Alloy Powder]

It is not preferable that the C content (carbon content) is 0.61% or more; or the Si content is 0.15% or more, as the inevitable impurities in the Cu—Ni alloy powder or the Ni—Cu alloy powder, each of which is the source material when the sintered sliding material is produced by sintering, since it causes to abnormal expansion; and the dimensional consistency of the sintered sliding material is destabilized. If the C content as impurities in the powder were set to less than 10 ppm, the production cost of the raw material for removal of C from the raw material powder would be extremely high. Thus, it is not preferable.

Because of this, it is preferable that the C content is 0.61 mass % or less and a Si content is 0.15 mass % or less as inevitable impurities in the Cu—Ni alloy powder or the Ni—Cu alloy powder.

Although it is not necessarily indispensable configuration, a more preferable range of the C content is 0.002 mass % to 0.61 mass % as inevitable impurities in the Cu—Ni alloy powder or the Ni—Cu alloy powder. Similarly, although it is not necessarily indispensable configuration, a more preferable range of the Si content is 0.015 mass % to 0.15 mass % as inevitable impurities in the Cu—Ni alloy powder or the Ni—Cu alloy powder.

The sintered sliding material obtained by using these alloy powders shows the same tendency in terms of the C and Si contents in impurities. If the C content in the sintered material were 0.6% or more or the Si content in the sintered material were 0.15% or more, the sintered material would be deformed; and dimensional consistency is destabilized for the yield to be deteriorated. Thus, it is not preferable.
[Porosity: 8-25%]

The alloy grains 11 constituting the matrix of the sintered sliding material 15 is made of the Cu—Ni alloy grains or the Ni—Cu alloy grains. The pores dispersedly distributed in the matrix made of these alloy grains 11 have an action to relax strong impact and high pressure loaded on the bearing part 1 under the condition where the liquid fuel passes at high pressure and high speed as described above, thereby suppressing wear on the bearing part 1 significantly. However, if the porosity were less than 8%, the action would not be exhibited sufficiently since the ratio of the pores distributed in the matrix becomes too low. If the porosity exceeded 28%, strength as the bearing part would be reduced. Therefore, the upper limit of the porosity is set to 28%.

Although it is not necessarily indispensable configuration, a more preferable range of the porosity is 10% to 20%. An even more preferable range of the porosity is 12% to 18%.
[Method of Producing the Sintered Sliding Material]

In order to produce the sintered sliding material 15 of the present embodiment, the Cu—Ni alloy powder or the Ni—Cu alloy powder; the Cu powder; the Ni powder; the Cu—P powder; the graphite powder; and the Sn powder, each of which has a predetermined average grain size in the range of about 10-100 μm, are prepared as starting materials.

After blending each of these powders to obtain the final goal composition ratio, 0.1-1.0% of lubricant such as zinc stearate and the like, for example about 0.5%, is added to the mixture; and the mixture is uniformly mixed for about tens of minutes by a mixer to obtain the mixed powder. Next, the mixed powder is poured in the mold of a pressing machine to perform press molding and to obtain a green compact in an intended shape, such as in a ring-shape, for example.

The intended ring-shaped sintered sliding material can be obtained by sintering the green compact at a predetermined temperature in the range of 960-1140° C. in the endothermic gas atmosphere, which is obtained by mixing natural gas and air and passing the mixed gas thorough heated catalyst to be decomposed and denatured, for example.

During sintering, Sn and Cu—P, which are low melting point raw materials (about 232° C., and about 718° C., respectively), are melted in the sintering process; and Sn and P diffuse into the grains made of the Cu—Ni alloy powder or the Ni—Cu alloy powder to be alloyed. Because of this, the structure shown in FIG. 2, in which the free graphite 13 exists in the pore parts in the grain boundaries of the Cu—Ni alloy grains or the Ni—Cu alloy grains in which Sn or P is solid melted, is obtained after sintering.

In the case where the Cu—Ni alloy powder or the Ni—Cu alloy powder is produced, the atomizing method in which powdering is performed by quenching from the alloy melt is used. In this case, the amounts of C and Si included in the above-mentioned alloy powders can be reduced by properly choosing: the addition amounts of C and Si used for desulfurization; the material of the crucible; and time in which the alloy is melted, by controlling the melting temperature of the alloy, and the like.

EXAMPLES

The present invention is explained in more detail by showing Examples below. However, the present invention is not limited by the descriptions of Examples.

Example 1

As raw materials, the Cu—Ni powder and the Ni—Cu powder; the Sn atomized powder with the grain size of 250-mesh; the Cu-8% P atomized powder with the grain size of 200-mesh; and the graphite powder were prepared. The atomized powders were obtained by the atomizing method, in which alloy melt having the intended composition was formed in a crucible in a high frequency melting furnace; and the alloy melt was quenched by spouting out the alloy melt from the ejection nozzle provided on the bottom part of the crucible into the inside of water body.

These raw material powders were blended to obtain the final component compositions shown in Table below. Then, 0.5% of zinc stearate was added, and the mixture was mixed for 20 minutes by a V-type mixer. Then, the mixture was subjected to press molding to produce a green compact. Next, the green compact was sintered at the predetermined temperature in the range of 960-1140° C. in the endothermic gas atmosphere, which was obtained by mixing natural gas and air and passing the mixed gas thorough heated catalyst to be decomposed and denatured to obtain the sintered sliding material.

Each of the produced sintered sliding materials had the dimension of: 10 mm of the outer diameter; 5 mm of the inner diameter; and the 5 mm of the height. They were the ring-shaped sintered sliding materials (the bearing parts) made of the sintered Ni—Cu—Sn-based alloy having the component compositions shown Table below. Samples Nos. 1-22 of Examples of the present invention; and samples Nos. 23-34 of Comparative Examples, all of which were identically-shaped ring-shaped test pieces, were produced and subjected to the tests described below.

In the raw material powders, the C and S contents, which were included in the Cu—Ni powder and Ni—Cu powder as impurity elements, were controlled by adjusting the amount of impurities included in the raw materials before the atomizing treatment, in which the Cu—Ni powder and the Ni—Cu powder were produced.

Specifically, samples Nos. 1-8 were produced by blending powders so as to obtain the compositions shown in Table 1 by using the raw materials having the impurity amounts (C contents and Si contents) shown in Table 1. In addition, all of other Examples of the present invention and Comparative Examples were produced so as to obtain the composition ratios of samples by using the sample that had the impurity C content and the impurity Si content of the sample No. 3 in Table 1 as the raw materials. In addition, multiple samples having varied porosities were produced as shown in Tables 2 and 3. On these samples, the sintering temperature; the radial crushing strength; the dimensional change; and the yield, were measured. Then, the corrosion test and the sliding test were performed on these samples.

Dimensional Change (DC):

The outer diameter of the green compact was measured before sintering in advance; and sintering was performed. Then, the dimension of the sintered material (the sintered sliding material) after sintering was measured; and the dimensional change before and after sintering was obtained by calculation.

Yield:

The yield was obtained as the ratio in which the dimension after sizing was within the tolerance range. Grading was based on the measurement results of 50 samples. In the case where 96% or more satisfied the criteria, it was graded "A." In the case where 90% or more and less than 96% satisfied the criteria, it was graded "B." In the case where less than 90% satisfied the criteria, it was graded "C."

Corrosion Test:

The organic acid test solution, which emulated inferior quality gasoline (pseudo inferior gasoline), was prepared by adding carboxylic acid represented by the formula, RCOOH (R was a hydrogen atom or a hydrocarbon group), to gasoline.

The pseudo inferior gasoline was prepared by adding the organic acid in about 5-times higher concentration than the conventional pseudo inferior gasoline corresponding to the decomposed biofuel.

The multiple bearing parts 1 for testing were immersed in this organic acid test solution in a warm bath (60° C.) for 500 hours.

After the corrosion test, products adhered to the surface of the bearing part 1 were removed by chemical. Then, the mass change rate between: the mass before immersing in the organic acid test solution: and the mass of the bearing part 1 after removal of the adhered products after immersion was measured. In the corrosion resistance columns of each Table, the grade "A" or "B" is shown. The grade "A" indicates that the mass change rate satisfied, 0% ≥(the mass change rate)≥−0.40% in the sample. The grade "B" indicates that the mass change rate satisfied, −0.40%>(the mass change rate) in the sample.

Sliding Test:

The wear resistance test was performed in the condition where the bearing was subjected to high pressure and fast flowing gasoline by: circulation of gasoline in a narrow space at high speed; and high speed rotation of the motor causing the fast flowing gasoline.

The bearing part was installed on a fuel pump having the outer length dimensions of 110 mm×40 mm; and this fuel pump was placed in the gasoline tank. Actual machine test was performed in the condition of: 5,000-15,000 rpm of the impeller rotation speed; 50-250 L/hour of the flow of gasoline; 500 kPa at maximum of the pressure loaded on the bearing due to high speed rotation; and 500 hours of the test time. The grade "A" indicates that the maximum wear depth on the bearing surface after the test satisfied, 0 μm≤(the maximum wear depth)≤10 μm in the sample. The grade "B" indicates that the maximum wear depth on the bearing surface after the test satisfied, 10 μm<(the maximum wear depth) in the sample.

TABLE 1

| Sintered sliding material | | Component composition (mass %) | | | | | C content and Si content as impurities in raw material powder (mass %) | | C content and Si content as impurities in sintered material (mass %) | | Sintering temperature (° C.) | Dimensional Change (%) | Yield A, B, or C | Sliding characteristics A or B | Corrosion resistance A or B |
|---|---|---|---|---|---|---|---|---|---|---|---|---|---|---|---|
| | | Ni | Sn | P | C | Cu | Impurity C | Impurity Si | Impurity C | Impurity Si | | | | | |
| Example of the present invention | 1 | 55 | 9 | 0.2 | 5 | balance | 0.005 | 0.015 | 0.008 | 0.017 | 1050 | +0.13 | A | A | A |
| | 2 | 55 | 9 | 0.2 | 5 | balance | 0.013 | 0.020 | 0.031 | 0.016 | 1030 | +0.37 | A | A | A |
| | 3 | 55 | 9 | 0.2 | 5 | balance | 0.035 | 0.030 | 0.027 | 0.024 | 1050 | +0.64 | A | A | A |
| | 4 | 55 | 9 | 0.2 | 5 | balance | 0.210 | 0.041 | 0.190 | 0.042 | 1080 | +0.79 | B | A | A |
| | 5 | 55 | 9 | 0.2 | 5 | balance | 0.43 | 0.070 | 0.37 | 0.075 | 1050 | +0.81 | B | A | A |
| | 6 | 55 | 9 | 0.2 | 5 | balance | 0.61 | 0.150 | 0.60 | 0.15 | 1050 | +1.15 | B | A | A |
| Comparative Example | 7 | 55 | 9 | 0.2 | 5 | balance | 0.91 | 0.183 | 0.87 | 0.18 | 1080 | +2.83 | C | A | A |
| | 8 | 55 | 9 | 0.2 | 5 | balance | 1.14 | 0.130 | 1.05 | 0.14 | 1050 | +3.14 | C | A | A |

TABLE 2

| Sintered sliding material | | Component composition (mass %) | | | | | Sintering temperature (° C.) | Porosity (%) | Radial crushing strength (N/mm²) | Dimensional change (%) | Yield A, B, or C | Sliding characteristics A or B | Corrosion resistance A or B |
|---|---|---|---|---|---|---|---|---|---|---|---|---|---|
| | | Ni | Sn | P | C | Cu | | | | | | | |
| Example of the present invention | 3 | 55 | 9 | 0.2 | 5 | balance | 1050 | 13.8 | 320 | +0.64 | A | A | A |
| | 9 | 55 | 9 | 0.2 | 5 | balance | 1020 | 8.1 | 435 | +0.97 | B | A | A |
| | 10 | 55 | 9 | 0.2 | 5 | balance | 1050 | 18.7 | 284 | +0.49 | A | A | A |
| | 11 | 55 | 9 | 0.2 | 5 | balance | 1050 | 25.2 | 236 | +0.30 | B | A | A |
| | 12 | 55 | 9 | 0.2 | 5 | balance | 1050 | 28.0 | 203 | +0.23 | B | A | A |
| | 15 | 36 | 9 | 0.2 | 5 | balance | 960 | 15.0 | 238 | +0.97 | B | A | A |
| | 16 | 40 | 9 | 0.2 | 5 | balance | 980 | 15.9 | 272 | +0.84 | A | A | A |
| | 17 | 75 | 9 | 0.2 | 5 | balance | 1090 | 15.0 | 416 | +0.51 | B | A | A |
| | 18 | 86 | 9 | 0.2 | 4 | balance | 1120 | 15.1 | 515 | +0.32 | B | A | A |
| | 19 | 55 | 1 | 0.2 | 5 | balance | 1050 | 14.9 | 298 | +0.25 | A | A | A |
| | 20 | 55 | 3 | 0.2 | 5 | balance | 1030 | 14.8 | 335 | +0.17 | A | A | A |
| | 21 | 55 | 6 | 0.2 | 5 | balance | 1050 | 16.1 | 363 | +1.08 | A | A | A |
| | 22 | 55 | 11 | 0.2 | 5 | balance | 1050 | 14.6 | 330 | +1.41 | B | A | A |
| | 23 | 55 | 9 | 0.05 | 5 | balance | 1050 | 15.4 | 286 | +1.23 | B | A | A |
| | 24 | 55 | 9 | 0.4 | 5 | balance | 1050 | 15.4 | 363 | +0.68 | B | A | A |
| | 25 | 55 | 9 | 0.75 | 5 | balance | 1010 | 14.7 | 384 | +0.75 | B | A | A |
| | 26 | 55 | 9 | 1 | 5 | balance | 1070 | 15.5 | 471 | +0.78 | B | A | A |
| | 27 | 55 | 9 | 0.2 | 1 | balance | 1050 | 15.4 | 620 | −0.22 | B | A | A |
| | 28 | 55 | 9 | 0.2 | 2 | balance | 1050 | 15.9 | 500 | +0.16 | A | A | A |
| | 29 | 55 | 9 | 0.2 | 3 | balance | 1050 | 15.2 | 443 | +0.17 | B | A | A |
| | 30 | 55 | 9 | 0.2 | 7 | balance | 1080 | 14.6 | 303 | +0.98 | B | A | A |
| | 31 | 55 | 9 | 0.2 | 9 | balance | 1050 | 14.4 | 271 | +1.34 | B | A | A |

TABLE 3

| Sintered sliding material | | Component composition (mass %) | | | | | Sintering temperature (° C.) | Porosity (%) | Radial crushing strength (N/mm²) | Dimensional change (%) | Yield A, B, or C | Sliding characteristics A or B | Corrosion resistance A or B |
|---|---|---|---|---|---|---|---|---|---|---|---|---|---|
| | | Ni | Sn | P | C | Cu | | | | | | | |
| Comparative Example | 13 | 89 | 9 | 0.2 | 1 | balance | 1160 | 7.1 | 713 | +2.01 | C | B | A |
| | 14 | 55 | 9 | 0.2 | 11 | balance | 1050 | 29.6 | 168 | +0.11 | B | B | B |
| | 32 | 25 | 9 | 0.3 | 5 | balance | 900 | 15.3 | 230 | +1.02 | A | A | B |
| | 33 | 30 | 9 | 0.2 | 5 | balance | 925 | 14.6 | 232 | +1.31 | B | A | B |
| | 34 | 55 | 0 | 0.2 | 5 | balance | 1050 | 15.2 | 274 | +0.48 | A | A | B |
| | 35 | 55 | 0.5 | 0.2 | 5 | balance | 1050 | 14.5 | 286 | +0.31 | A | A | B |
| | 36 | 55 | 12 | 0.2 | 5 | balance | 1020 | 14.7 | 324 | +2.24 | C | A | A |
| | 37 | 55 | 15 | 0.2 | 5 | balance | 1050 | 15.5 | 310 | +2.39 | C | A | A |
| | 38 | 55 | 9 | 0 | 5 | balance | 1050 | 14.5 | 268 | +1.80 | C | A | B |
| | 39 | 55 | 9 | 1.25 | 5 | balance | 1030 | 14.9 | 514 | +1.65 | C | A | A |
| | 40 | 55 | 9 | 0.2 | 0 | balance | 1050 | 14.9 | 709 | −0.63 | A | B | A |
| | 41 | 55 | 9 | 0.2 | 0.5 | balance | 1080 | 15.0 | 660 | −0.30 | A | B | A |

The samples Nos. 1-6 in Table 1 were the samples in which both contents of C and Si as impurities were reduced. In each of these samples, the dimensional change was low, and the yield was excellent.

The sample No. 7 was the sample in which both contents of C and Si as impurities were high; and the dimensional change was high. The sample No. 8 was the sample in which only the C content as impurities was high, the C content exceeding 1%. In this sample No. 8, the dimensional change became even higher. In any one of samples Nos. 7-8, the yield was bad.

Each of the samples Nos. 13, 14, 32-41 in Table 3 had the C and Si contents as impurities of the sample 3 in Table 1, and the contents of Ni, Sn, P, and C were defined as shown in Tables 2 and 3 as other compositions.

The samples 9-12 in Table 2 were the samples, in which the contents of Ni, Sn, P, and C were identical, but the sintering temperature was changed to 1020° C. or 1050° C.; or the porosity was changed within the range of 8.1-28%. In each of the samples 9-12, the dimensional change was low; and the yield was excellent. In addition, both of the sliding characteristics and the corrosion resistance were excellent. The value of the porosity and the radial crushing strength were in reverse proportional relationship. When the porosity was less than the range of 8-28%, the radial crushing strength tended to be too high. When the porosity was higher than the range of 8-28%, the radial crushing strength tended to be too low.

The samples Nos. 15-18 in Table 2 were the samples which were produced by varying their Ni contents. In each of the samples Nos. 15-18, the yield, the sliding characteristics, and the corrosion resistance were excellent. Contrary to that, there was a problem in corrosion resistance in the samples Nos. 32-33 shown in Table 3, in which the Ni contents were low. In addition, both of the yield and the sliding characteristics were deteriorated; and the dimensional change was high in the sample No. 13, in which the Ni content was too high.

The samples Nos. 19-22 in Table 2 were the samples which were produced by varying their Sn contents. In each of the samples Nos. 19-22, the yield, the sliding characteristics, and the corrosion resistance were excellent. Contrary to that, there was a problem in corrosion resistance in each of the sample No. 34 free of Sn in Table 3 and the sample No. 35 having a low Sn content. In the sample No. 36 having the too high Sn content, the yield was deteriorated; and the dimensional change was high. In the sample No. 37 having even higher Sn content than the sample No. 36, the yield was deteriorated; and the dimensional change became even higher The samples Nos. 23-26 in Table 2 were the samples which were produced by varying their P contents. In each of the samples Nos. 23-26, the yield, the sliding characteristics, and the corrosion resistance were excellent. Contrary to that, there was a problem in the yield and the corrosion resistance in the sample No. 38 free of P. In addition, the yield was deteriorated in the sample No. 39 having a too high P content.

The samples No. 27-31 in Table 2 were the samples which were produced by varying their C contents. In each of the samples Nos. 23-26, the yield, the sliding characteristics, and the corrosion resistance were excellent. Contrary to that, there was a problem in the slicing characteristics in the sample No. 40 free of C. In addition, in the sample No. 41 having a low C content, the sliding characteristics were deteriorated. Comparative Example 14 in Table 3 is an example having a too high C content. In Comparative Example 14, the radial crushing strength was low; and the sliding characteristics and the corrosion resistance were deteriorated.

Based on the results described above, it was demonstrated that the sintered sliding material, in which the dimensional change was low; the yield was excellent; the sliding characteristics were excellent; and the mass change was low in the corrosion resistance test, could be provided, if the sintered sliding material had the composition satisfying the relationship of: 36-86% of Ni; 1-11% of Sn; 0.05-1.0% of P; 1-9% of C; and the Cu balance, while the C content and the Si content as impurities were kept at low amounts.

Figure 4:
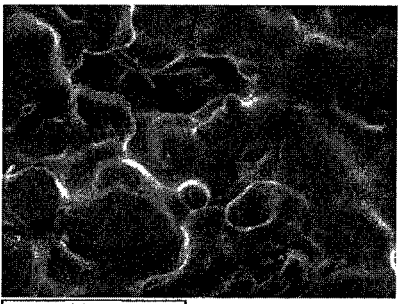
FIG. 4 is a structural photographs showing the corrosion resistance test results of organic acid-containing gasoline on the surface of each sample obtained in Example and Comparative Example in comparison.
Figure 4:
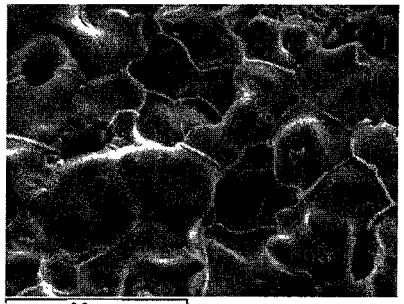
Figure 4:
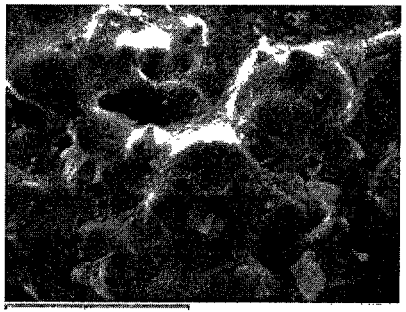
Figure 4:
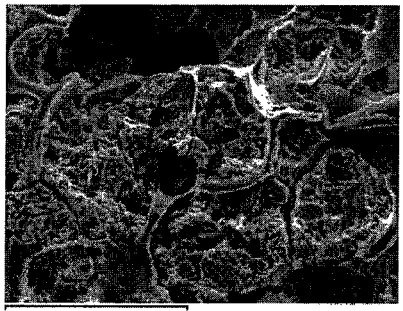

FIG. 4 is a drawing showing the state of the surfaces of the conventional example (the sample No. 32 in Table 2) and Example of the present invention (the sample No. 3) before the test and after immersion in the organic acid-containing gasoline. An enlarged part of the surface is shown in the drawing.

Compared to the conventional example (No. 32), it was demonstrated that a better surface condition was obtained even after immersion in the organic acid-containing gasoline in the sample of Example of the present invention (No. 3).

INDUSTRIAL APPLICABILITY

A Cu-based sintered bearing having excellent corrosion resistance, heat resistance, wear resistance; and high dimensional accuracy can be provided.

REFERENCE SIGNS LIST

1: Bearing part
2: Fuel pump
3: Casing
5: Motor (armature)
6: Rotating shaft
7: Impeller
8: Inlet
9: Outlet
11: Alloy grain
12: Pore
13: Free graphite
15: Sintered sliding material

What is claimed is:

1. A sintered sliding material with excellent corrosion resistance, heat resistance, and wear resistance, said sintered sliding material comprising:
    36 to 86 mass % of Ni;
    1 to 11 mass % of Sn;
    0.05 to 1.0 mass % of P;
    1 to 9 mass % of C; and
    a balance being Cu and inevitable impurities, wherein
    the sintered sliding material is made of a sintered material of a plurality of grains of alloy of Ni—Cu alloy or Cu—Ni alloy, the Ni—Cu alloy and the Cu—Ni alloy containing Sn, P, C, and Si,
    the sintered material has a structure in which pores are dispersedly formed in grain boundaries of the plurality of the grains of alloy, and
    the inevitable impurities are contained in a matrix constituted from the grains of alloy and comprise a C content of 0.6 mass % or less and a Si content of 0.15 mass % or less.

2. The sintered sliding material with excellent corrosion resistance, heat resistance, and wear resistance according to claim 1, wherein a Ni content in the sintered material is 40 mass % or more and 80 mass % or less.

3. The sintered sliding material with excellent corrosion resistance, heat resistance, and wear resistance according to claim 1, wherein a Ni content in the sintered material is 45 mass % or more and 70 mass % or less.

4. The sintered sliding material with excellent corrosion resistance, heat resistance, and wear resistance according to claim 1, wherein a Sn content in the sintered material is 3 mass % or more and 11 mass % or less.

5. The sintered sliding material with excellent corrosion resistance, heat resistance, and wear resistance according to claim 1, wherein a Sn content in the sintered material is 4 mass % or more and 10 mass % or less.

6. The sintered sliding material with excellent corrosion resistance, heat resistance, and wear resistance according to claim 1, wherein a P content in the sintered material is 0.1 mass % or more and 0.8 mass % or less.

7. The sintered sliding material with excellent corrosion resistance, heat resistance, and wear resistance according to claim 1, wherein a P content in the sintered material is 0.1 mass % or more and 0.6 mass % or less.

8. The sintered sliding material with excellent corrosion resistance, heat resistance, and wear resistance according to claim 1, wherein a C content in the sintered material is 2 mass % or more and 8 mass % or less.

9. The sintered sliding material with excellent corrosion resistance, heat resistance, and wear resistance according to claim 1, wherein a C content in the sintered material is 3 mass % or more and 8 mass % or less.

10. The sintered sliding material with excellent corrosion resistance, heat resistance, and wear resistance according to claim 1, wherein a porosity of the sintered material is 8 to 28%.

11. The sintered sliding material with excellent corrosion resistance, heat resistance, and wear resistance according to claim 1, wherein a porosity of the sintered material is 10 to 20%.

12. The sintered sliding material with excellent corrosion resistance, heat resistance, and wear resistance according to claim 1, wherein a porosity of the sintered material is 12 to 18%.

13. The sintered sliding material with excellent corrosion resistance, heat resistance, and wear resistance according to claim 1, wherein the 1 to 9 mass % of C exists as free graphite that interposes in the grain boundaries of the sintered material.

14. The sintered sliding material according to claim 1, wherein the 1 to 9 mass % of C exists as free graphite.

15. The sintered sliding material according to claim 1, wherein the sintered material of the plurality of grains of alloy includes the Ni—Cu alloy and the Cu—Ni alloy.

* * * * *